US012323345B2

(12) United States Patent
Liu et al.

(10) Patent No.: US 12,323,345 B2
(45) Date of Patent: Jun. 3, 2025

(54) AGGREGATED RESOURCE UNIT TRANSMISSION SCHEME FOR SINGLE STATION ALLOCATION IN WLAN

(71) Applicant: MediaTek Singapore Pte. Ltd., Singapore (SG)

(72) Inventors: Jianhan Liu, San Jose, CA (US); Shengquan Hu, San Jose, CA (US); Yongho Seok, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/882,048

(22) Filed: May 22, 2020

(65) Prior Publication Data

US 2020/0389934 A1 Dec. 10, 2020

Related U.S. Application Data

(60) Provisional application No. 62/859,280, filed on Jun. 10, 2019.

(51) Int. Cl.
 *H04L 5/00* (2006.01)
 *H04L 1/00* (2006.01)
 (Continued)

(52) U.S. Cl.
 CPC .......... *H04L 5/0044* (2013.01); *H04L 1/0003* (2013.01); *H04L 1/0013* (2013.01);
 (Continued)

(58) Field of Classification Search
 None
 See application file for complete search history.

(56) References Cited

U.S. PATENT DOCUMENTS

2016/0248542 A1\* 8/2016 Liu ................. H04L 1/1864
2017/0272295 A1\* 9/2017 Lee ................. H04L 27/26
(Continued)

FOREIGN PATENT DOCUMENTS

CA  2946926 A1    1/2017
EP  3706358 A1    9/2020
EP  3742638 A1 * 11/2020 ........... H04B 7/0413

OTHER PUBLICATIONS

802.111 Working Group of the 802 Committee; IEEE P802.11nTM/D9.0; Draft Standard for Information Technology—Telecommunications and information exchange between systems—local and metropolitan area networks—Specific requirements; Part 11: Wireless LAN Medium Access Control (MAC) and Physical Layer (PHY) specifications Amendment 5: Enhancements for Higher Throughput. Mar. 2009. 586 pp.

*Primary Examiner* — Yemane Mesfin
*Assistant Examiner* — Jeff Banthrongsack (57) ABSTRACT

Embodiments of the present invention provide transmission schemes and methods that can assign multiple resource units (RUs) to a single wireless station using Aggregate Media Access Control Protocol Data Unit (A-MPDUs) in a flexible transmission scheme for the multi-RUs transmission. Embodiments of the present invention can send and receive data sing multiple resource units allocated to a single wireless STA. A 20 MHz segment and a 40 MHz segment on either side of a punctured portion of an 80 MHz segment can be treated as separate resource units (RUs), and the RUs can be assigned to the same wireless user/device. Each punctured 80 MHz segment can be interleaved separately. Different processes for encoding data and transmission schemes for transmitting the data are described herein according to embodiments of the present invention. Different transmission schemes can be used based on the size and number of the RUs allocated to an STA.

20 Claims, 10 Drawing Sheets

(51) Int. Cl.
  *H04L 27/26* (2006.01)
  *H04W 72/0453* (2023.01)
  *H04W 80/02* (2009.01)
  *H04W 80/08* (2009.01)

(52) U.S. Cl.
  CPC ..... *H04L 27/2602* (2013.01); *H04W 72/0453* (2013.01); *H04W 80/02* (2013.01); *H04W 80/08* (2013.01)

(56) References Cited

U.S. PATENT DOCUMENTS

| | | |
|---|---|---|
| 2017/0279864 A1 | 9/2017 | Chun et al. |
| 2017/0317868 A1 | 11/2017 | Lin et al. |
| 2019/0097850 A1 | 3/2019 | Kenney et al. |
| 2019/0132743 A1 | 5/2019 | Vanka et al. |
| 2019/0141717 A1 | 5/2019 | Yang et al. |
| 2020/0154443 A1* | 5/2020 | Patil ............... H04W 72/005 |
| 2020/0305164 A1* | 9/2020 | Yang ............... H04L 5/0007 |

* cited by examiner

AGGREGATED RESOURCE UNIT TRANSMISSION SCHEME FOR SINGLE STATION ALLOCATION IN WLAN

CROSS-REFERENCE TO RELATED APPLICATIONS

This application claims the benefit of and priority to provisional patent application Ser. No. 62/859,280, with filing date Jun. 10, 2019, by Jianhan Liu, et al., which is hereby incorporated by reference in its entirety.

FIELD

Embodiments of the present invention generally relate to the field of wireless communications. More specifically, embodiments of the present invention relate to systems and methods for transmitting data over multiple resource units allocated to a single wireless station within a wireless communication network.

BACKGROUND

Existing approaches to WLAN wireless communication involve tone plans used to map complex constellation points of codewords to nonadjacent addresses or index values. Interleaving the codeword mapping is important to reduce the error rate of wireless transmissions, for example, caused by burst errors. This type of mapping in effect spreads the data out over frequencies to make channel errors more correctable via error correction algorithms. Existing tone plans typically define resource units including a number of data tones ($N_{SD}$) that can be assigned to specific users/clients. The size of the channel's resource units depends on the channel's bandwidth and tone spacing. The bands currently available for 5 GHz transmissions are 20 MHz, 40 MHz, 80 MHz, and 160 MHz. Typically narrower channel bandwidths can support a greater number of users/clients, where wider channel bandwidths can provide greater throughput.

Preamble puncturing can be used to avoid interference at certain frequencies that are otherwise available to a wireless network. For example, in some cases it is useful to "puncture" a hole or gap in the middle of a spectrum segment to avoid interference caused by radar. When a radar signal is detected, it is possible to puncture a 20 MHz segment that is used by radar out of an 80 MHz segment (resource unit), for example, thereby creating a 20 MHz segment and a 40 MHz segment on either side of the punctured portion. Under the existing protocols of IEEE 802.11ax, the 20 MHz segment and the 40 MHz segment can be treated as separate resource units and assigned to different wireless users/devices. However, it is not possible to assign both resource units to the same wireless user/device under the existing approach.

SUMMARY

Accordingly, what is needed is an approach to wireless transmissions that can assign multiple resource units (RUs) to a single wireless station (STA) to utilize the available spectrum more efficiently, enhance spectral efficiency and network throughput when preamble puncturing is used, and achieve frequency diversity to improve the overall link quality. Embodiments of the present invention can assign multiple resource units (RUs) to a single wireless station using Aggregate Media Access Control Protocol Data Unit (A-MPDUs) in a flexible transmission scheme for multi-RU transmissions. Embodiments of the present invention can send and receive data using multiple resource units allocated to a single wireless STA. For example, a 20 MHz segment and a 40 MHz segment on either side of a punctured portion of an 80 MHz segment can be treated as separate resource units (RUs), and the RUs can be assigned to the same wireless user/device. According to some embodiment, each punctured 80 MHz segment is interleaved separately. Different processes for encoding data and different transmission schemes for transmitting the data are described herein according to embodiments of the present invention. According to some embodiments, certain transmission schemes are used based on the size and the number of RUs allocated to an STA.

According to one embodiment, a method of transmitting data over multiple resource units (RUs) allocated to a single wireless station (STA) is disclosed. The method includes independently encoding a first RU for a first Physical Layer Convergence Procedure (PLCP) Service Data Unit (PSDU) and a second RU for a second PSDU, transmitting the first PSDU on the first RU, and transmitting the second PSDU on the second RU, where the first RU and the second RU are allocated to the wireless STA, and the first PSDU and the second PSDU share an EHT preamble.

According to some embodiments the first RU includes a 20 MHz segment and the second RU includes a 60 MHz segment of an 80 MHz segment.

According to some embodiments the method includes puncturing a 20 MHz segment of an 80 MHz segment to form the first RU and the second RU.

According to some embodiments the method includes performing a first modulation scheme for the first RU and performing a second modulation scheme for the second RU.

According to some embodiments the method includes performing a pre-forward error correction phase and a post-forward error correction phase.

According to some embodiments the PSDUs include an Aggregate Media Access Control Protocol Data Unit (A-MPDU).

According to some embodiments, jointly encoded bits are modulated on different RUs using a first quadrature amplitude modulation (QAM) modulation scheme.

According to some embodiments, jointly encoded bits on the first RU are modulated with a QAM modulation and the joint encoded bits on the second RU are modulated with a different QAM modulation.

According to a different embodiment, a method of transmitting data over multiple resource units (RUs) allocated to a single wireless station (STA) is disclosed. The method includes jointly encoding a first RU and a second RU for transmission of a single Physical Layer Convergence Procedure (PLCP) Service Data Unit (PSDU), and transmitting the PSDU on the first RU and the second RU, where the first RU and the second RU are allocated to the wireless STA.

According to some embodiments the method includes performing a first modulation scheme for the first RU and performing a second modulation scheme for the second RU.

According to some embodiments the method includes performing a pre-forward error correction phase and a post-forward error correction phase.

According to some embodiments the PSDUs include an Aggregate Media Access Control Protocol Data Unit (A-MPDU).

According to some embodiments the method includes parsing the first RU using a first parsing phase and parsing the second RU using a second parsing phase.

According to some embodiments the method includes parsing the first RU using a first modulation phase and parsing the second RU using a second modulation phase.

According to another embodiment, a method of transmitting data over multiple resource units (RUs) allocated to a single wireless station (STA) is disclosed. The method includes jointly encoding a first RU and a second RU for transmission of a first Physical Layer Convergence Procedure (PLCP) Service Data Unit (PSDU), jointly encoding a third RU and a fourth RU for transmission of a second Physical Layer Convergence Procedure (PLCP) Service Data Unit (PSDU), transmitting the first PSDU on the first RU and the second RU, and transmitting the second PSDU on the third RU and the fourth RU, where the first RU, the second RU, the third RU, and the fourth RU are allocated to the wireless STA.

According to some embodiments the method includes interleaving the first RU and the second RU using a first interleaving scheme, and interleaving the third RU and the fourth RU using a second interleaving scheme.

According to some embodiments the method includes setting values of Aggregation ID fields to signal that the first PSDU and the second PSDU include jointly encoded RUs.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 7-9) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aggregated RU Transmission Scheme for RUS Allocated to a Single Station in WLAN As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments of the present invention can assign multiple resource units to a single wireless STA. For example, a 20 MHz segment and a 40 MHz segment on either side of a punctured portion of an 80 MHz segment can be treated as separate resource units (RUs), and the RUs can be assigned to the same wireless user/device. According to some embodiment, each punctured 80 MHz segment is interleaved separately. Different processes for encoding data, and transmission schemes for transmitting the data, are described herein according to embodiments of the present invention. According to some embodiments, different transmission schemes are used based on the size and number of the RUs allocated to an STA.

Figure 1:
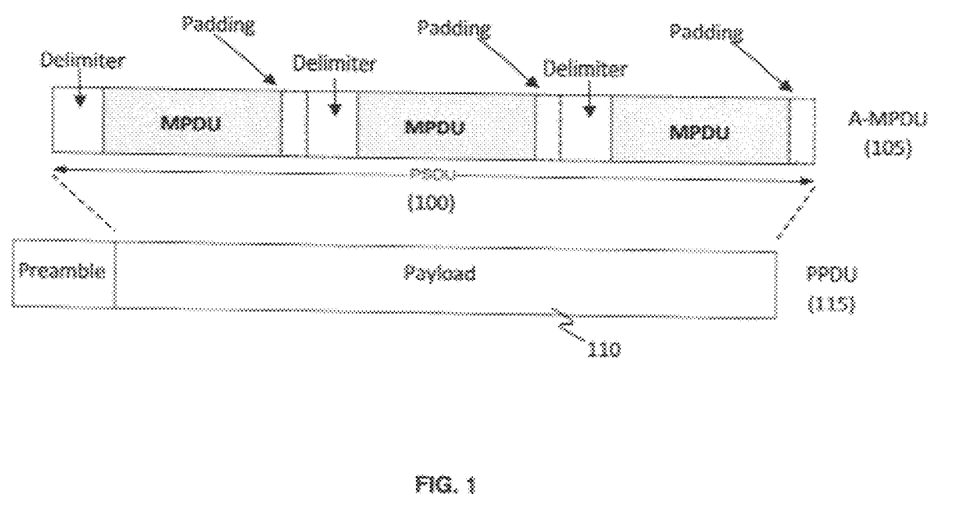
FIG. 1 is a block diagram of an exemplary Physical Layer Convergence Procedure (PLCP) Service Data Unit (PSDU) including an A-MPDU containing MPDU1, MPDU2, and MPDU3.

With regard to FIG. 1, an exemplary Physical Layer Convergence Procedure (PLCP) Service Data Unit (PSDU) 100 is shown including an A-MPDU 105 containing MPDU1, MPDU2, and MPDU3. A-MPDU 105 can be used as a payload 110 of a PPDU 115 for analog/RF transmission over a wireless network.

Figure 2:
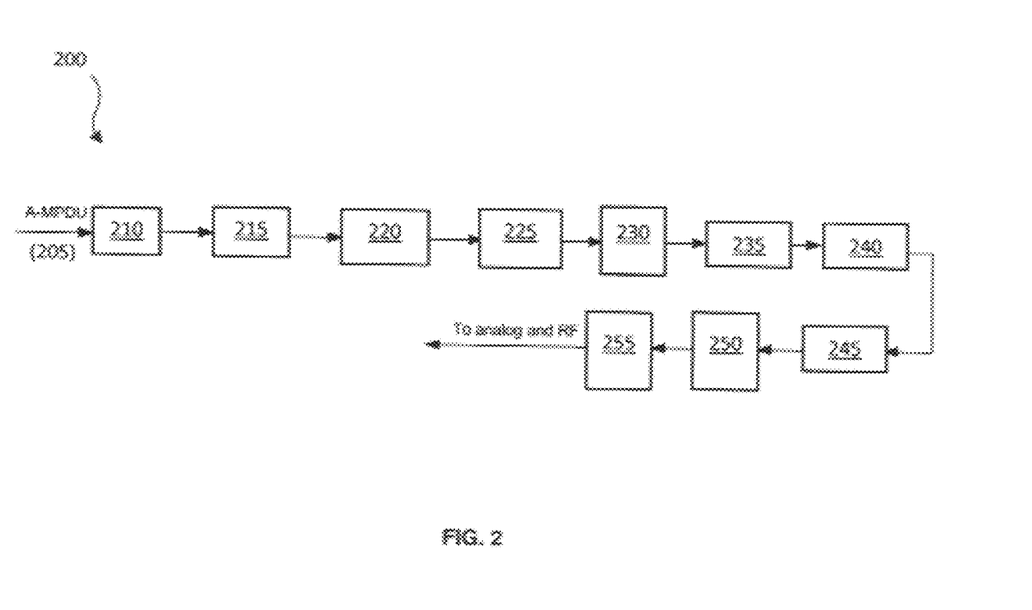
FIG. 2 shows an exemplary sequence of steps of a process for transmitting PSDUs that include an A-MPDU.

FIG. 2 shows an exemplary sequence of steps of a process 200 for transmitting PSDUs that include an A-MPDU 205. The process 200 includes a pre-forward error correction ("pre-FEC") phase 210, a scrambler phase 215, an encoder phase 220, a post-forward error correction ("post-FEC") phase 225, a streamer parser phase 230, a modulation phase 235, a tone mapper phase 240, a spatial mapping phase 245, an inverse discrete Fourier transform phase 250, and a guard interval phase 255. Process 200 can be used to transmit data over multiple RUs assigned to a single wireless STA. The modulation phase 235 can include performing a quadrature amplitude modulation (QAM) modulation scheme, and the encoder phase 220 can include performing low-density parity-check code (LDPC) encoding, for example.

Figure 3:
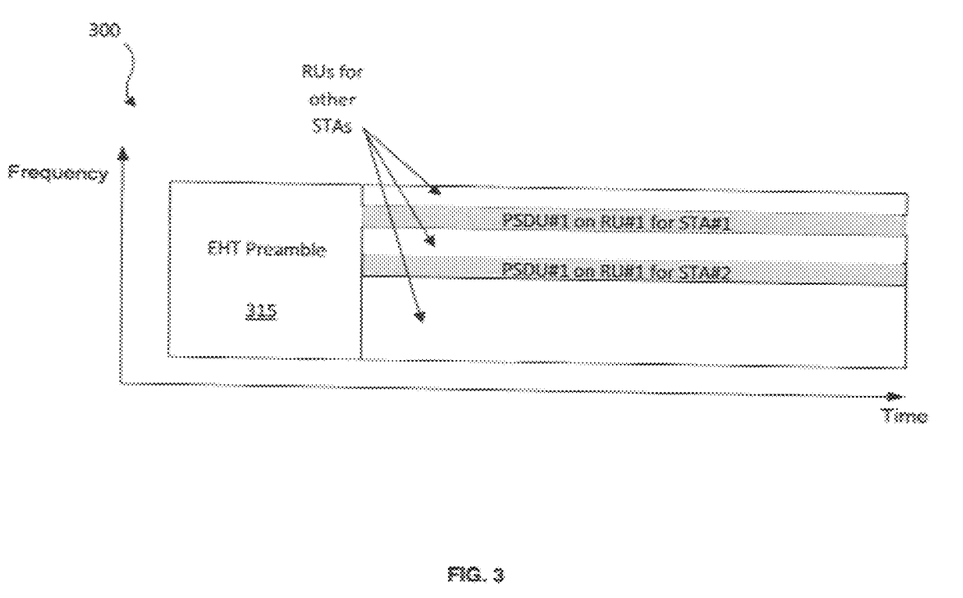
FIG. 3 shows an exemplary transmission scheme using multiple RUs allocated to a single STA to transmit data by transmitting independent PSDUs for each RU according to embodiments of the present invention.

With regard to FIG. 3, an exemplary transmission scheme 300 using multiple RUs allocated to a single STA to transmit data by transmitting independent PSDUs for each RU is depicted according to embodiments of the present invention. The transmission scheme 300 can be performed using the process 200 for transmitting PSDUs including an A-MPDU as depicted in FIG. 2, for example. As depicted in FIG. 3, RU #1 305 and RU #2 310 are allocated to STA #1, and the transmitter transmits PSDU #1 on RU #1 305 and PSDU #2 on RU #2 310. For use in WLAN based on IEEE 802.11 standards, the PSDUs can be independently encoded. PSDU #1 on RU #1 305 and PSDU #2 on RU #2 310 share an EHT preamble 315.

Figure 4:
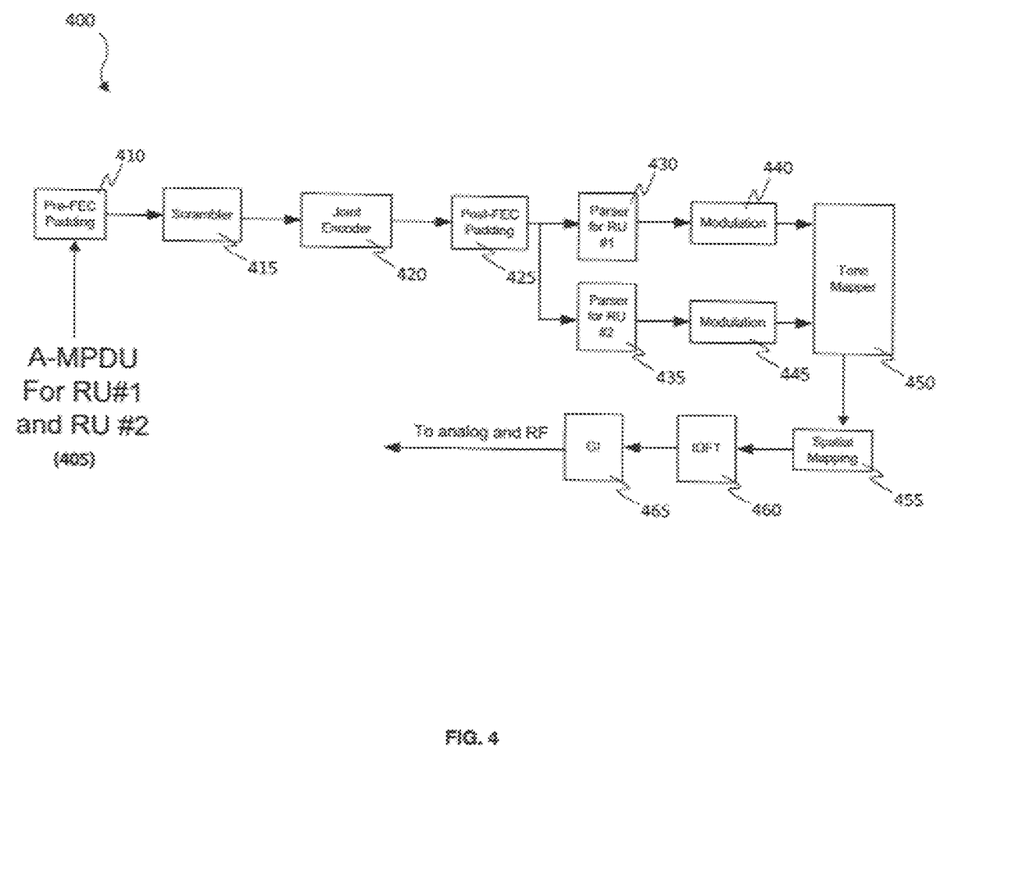
FIG. 4 shows an exemplary sequence of steps of a computer implemented process for transmitting a PSDU over multiple RUs according to embodiments of the present invention.

FIG. 4 shows an exemplary sequence of steps of a computer implemented process 400 for transmitting a PSDU (e.g., A-MPDU 405) over multiple RUs according to embodiments of the present invention. Process 400 includes a pre-FEC phase 410, a scrambler phase 415, a joint encoder phase 420, a post-FEC phase 425, streamer parser phases 430 and 435, modulation phases 440 and 445, a tone mapper phase 450, a spatial mapping phase 455, an inverse discrete Fourier transform phase 460, and a guard interval phase 465. Process 400 can transmit a single PSDU over multiple RUs using a joint encoding scheme (e.g., LDPC encoding), and RU #1 and RU #2 are parsed and modulated separately.

Compared to process 200 depicted in FIG. 2 that transmits multiple PSDUs, process 400 advantageously requires fewer decoders on the receiver side and can better utilize the frequency diversity available for transmitting the PSDU. The PSDU can include an A-MPDU 105 as depicted in FIG. 1, for example.

Figure 5:
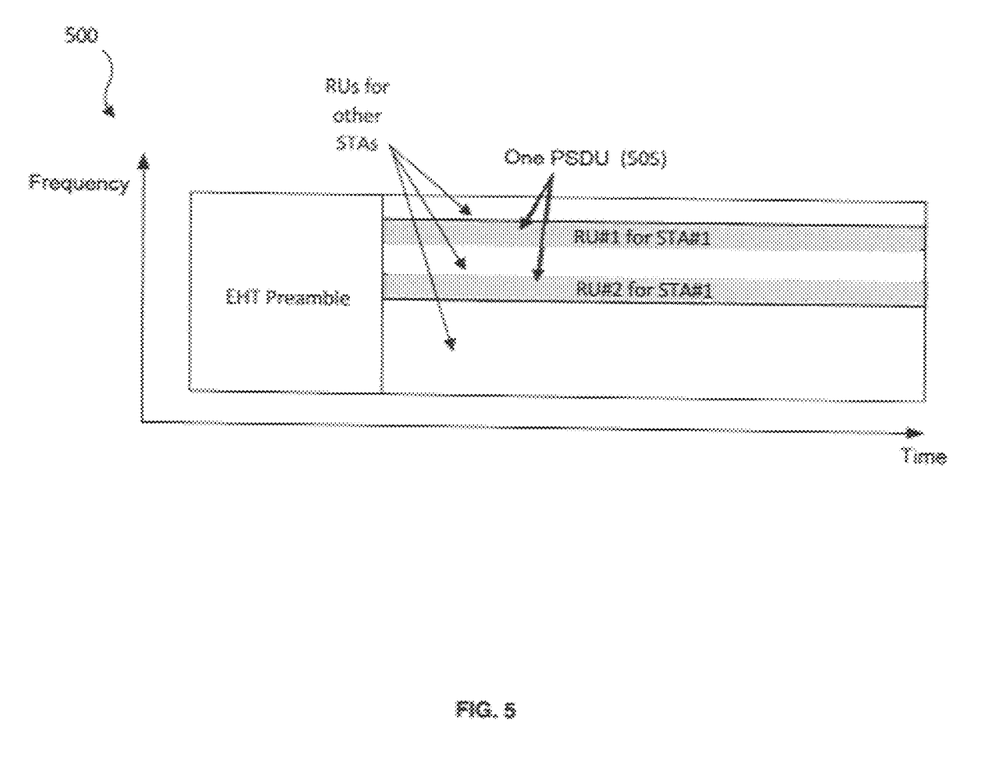
FIG. 5 shows an exemplary transmission scheme using multiple RUs allocated to a single STA to transmit data by transmitting a PSDU on multiple RUs according to embodiments of the present invention.

With regard to FIG. 5, an exemplary transmission scheme 500 using multiple RUs allocated to a single STA to transmit data by transmitting a PSDU on multiple RUs is depicted according to embodiments of the present invention. The transmission scheme 500 can be performed using the process 400 for transmitting a PSDU over multiple RUs as depicted in FIG. 4, for example. As depicted in FIG. 5, RU #1 510 and RU #2 515 are allocated to STA #1, and the transmitter transmits PSDU 505 on RU #1 510 and RU #2 515. PSDU 505 can be formed using a joint encoding scheme and transmitted on RU #1 510 and RU #2 515. From a MAC layer perspective, PSDU 505 appears to be transmitted on a single RU, and different interleaving schemes can be used on the RUs according to the size of the RU.

Figure 6:
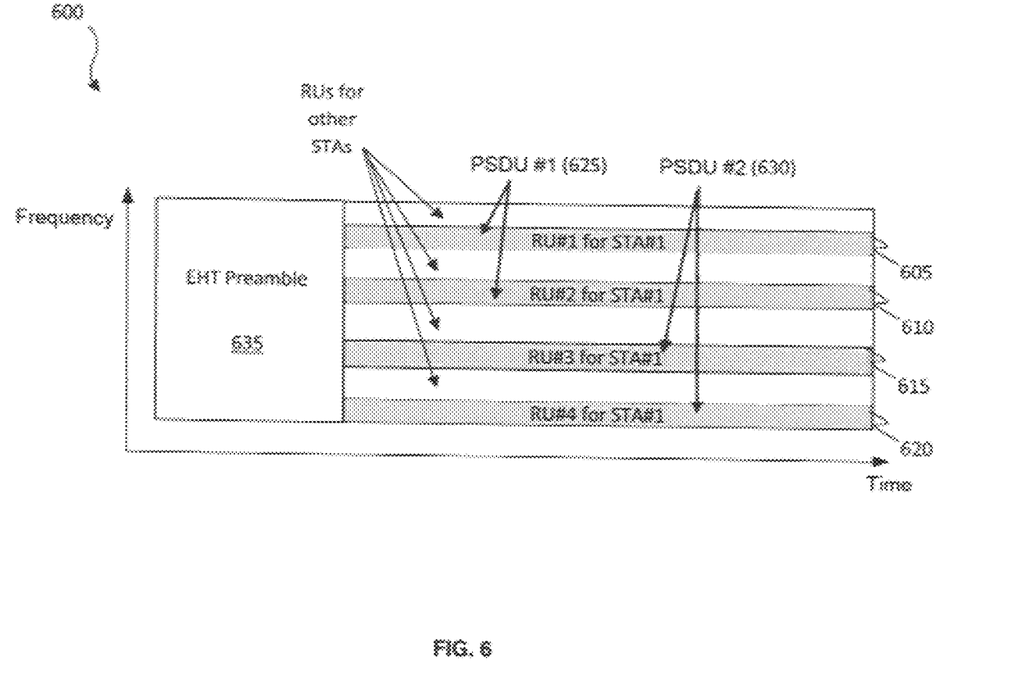
FIG. 6 depicts an exemplary transmission scheme using multiple RUs allocated to a single STA in a mixed transmission scheme according to embodiments of the present invention.

With regard to FIG. 6, an exemplary transmission scheme 600 using multiple RUs allocated to a single STA to transmit data in a mixed transmission scheme is depicted according to embodiments of the present invention. The transmission scheme 600 can be performed using the process 400 for transmitting PSDUs over multiple RUs as depicted in FIG. 4, for example. Mixed transmission scheme 600 groups allocated RUs into multiple groups, where each group contains one or more RUs. Multiple RUs can be transmitted in a single PSDU using the mixed transmission scheme 600. As depicted in FIG. 6, RU #1 650, RU #2 610, RU #3 615, and RU #4 620 are allocated to STA #1, and the transmitter transmits PSDU #1 625 on RU #1 605 and RU #2 610 using joint encoding. Similarly, PSDU #2 630 is transmitted on RU #3 615 and RU #4 620 using joint encoding.

In the example depicted in FIG. 6, four RUs (RU #1, RU #2, RU #3 and RU #4), are allocated to STA #1. The transmitter transmits PSDU #1 625 on RU #1 and RU #2 and PSDU #2 630 on RU #3 and RU #4 for transmitting data to STA #1. PSDU #1 625 and PSDU #2 630 can share an EHT preamble 635. Transmission scheme 600 advantageously requires fewer decoders on the receiver side, and the decoder schedule used to decode the transmission can relatively simple. Moreover, a relatively simple acknowledgement scheme can be used for acknowledgement of packets transmitted using scheme 600.

Different transmission schemes can preferred depending on the size and number of the RUs allocated to an STA. For example, according to some embodiments, transmission scheme 300 is used when the allocation includes two relatively large RUs, transmission scheme 500 is used when the allocation includes two relatively small contiguous RUs, and transmission scheme 600 is used when the allocation includes more than two RUs.

Figure 7:
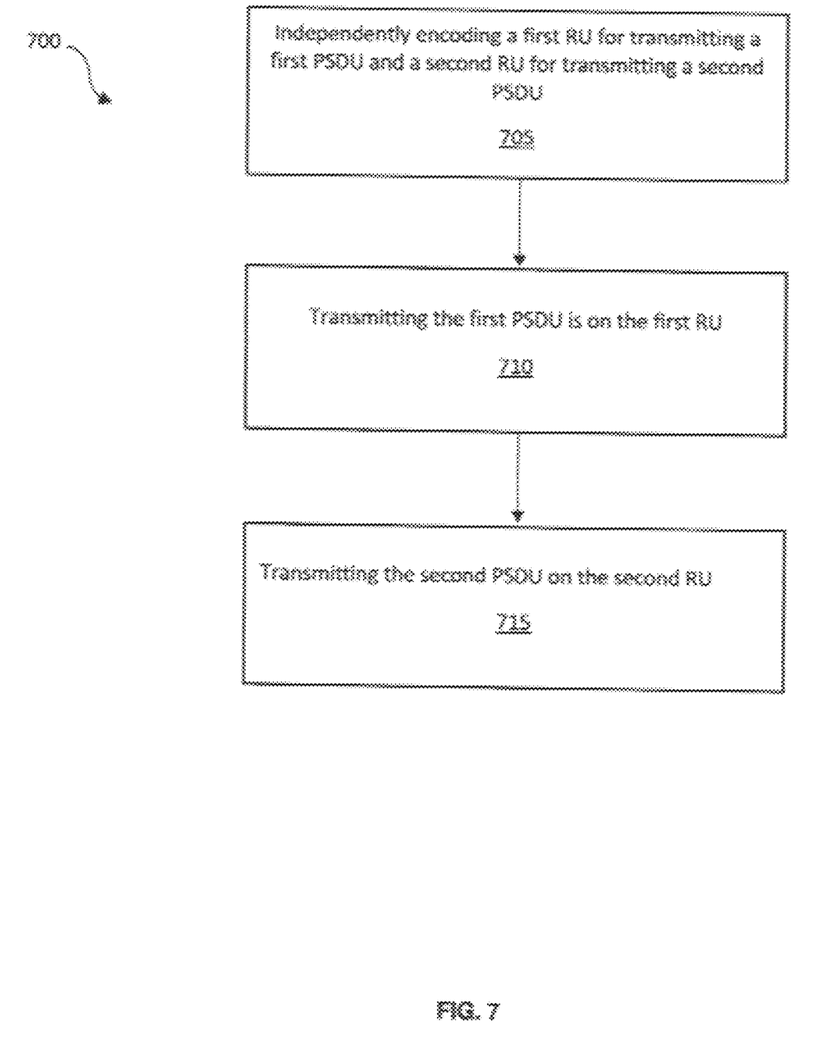
FIG. 7 is a flow chart depicting an exemplary sequence of computer implemented steps of a process for transmitting data over two RUs allocated to a single STA using two PSDUs according to embodiments of the present invention.

FIG. 7 is a flow chart depicting an exemplary sequence of computer implemented steps of a process 700 for transmitting data over multiple RUs allocated to a single STA according to embodiments of the present invention. At step 705, a first RU for transmitting a first PSDU and a second RU for transmitting a second PSDU are encoded independently. At step 710, the first PSDU is transmitted on the first RU. At step 715, the second PSDU is transmitted on the second RU. The RUs are allocated to the wireless STA, and the first PSDU and the second PSDU share an EHT preamble.

Figure 8:
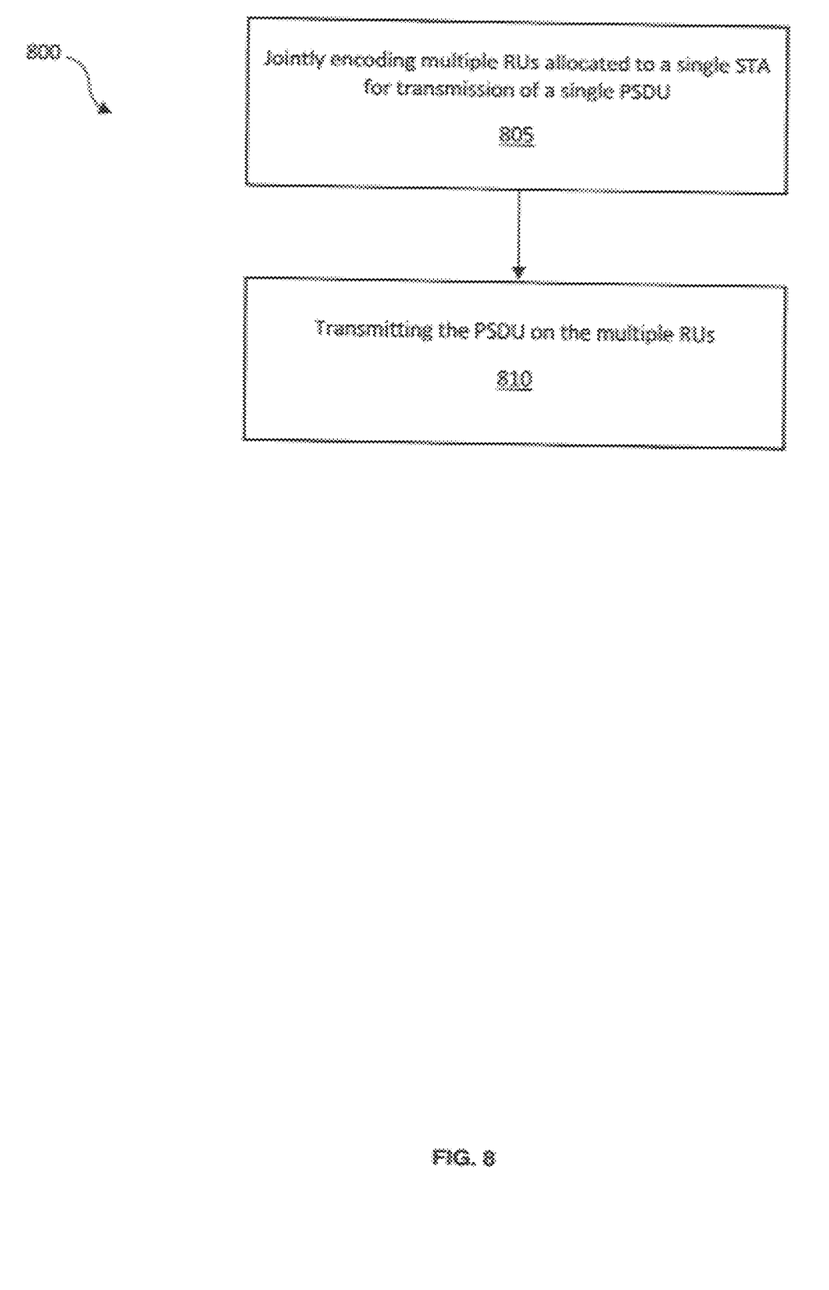
FIG. 8 is a flow chart depicting an exemplary sequence of computer implemented steps of a process for transmitting data over two RUs allocated to a single STA using joint encoding in a single PSDU according to embodiments of the present invention.

FIG. 8 is a flow chart depicting an exemplary sequence of computer implemented steps of a process 800 for transmitting data over multiple RUs allocated to a single STA according to embodiments of the present invention. Multiple RUs are allocated to a single wireless STA. At step 805, multiple RUs (e.g., 2) for transmission of a single PSDU are jointly encoded. At step 810, the PSDU is transmitted on the multiple RUs.

Figure 9:
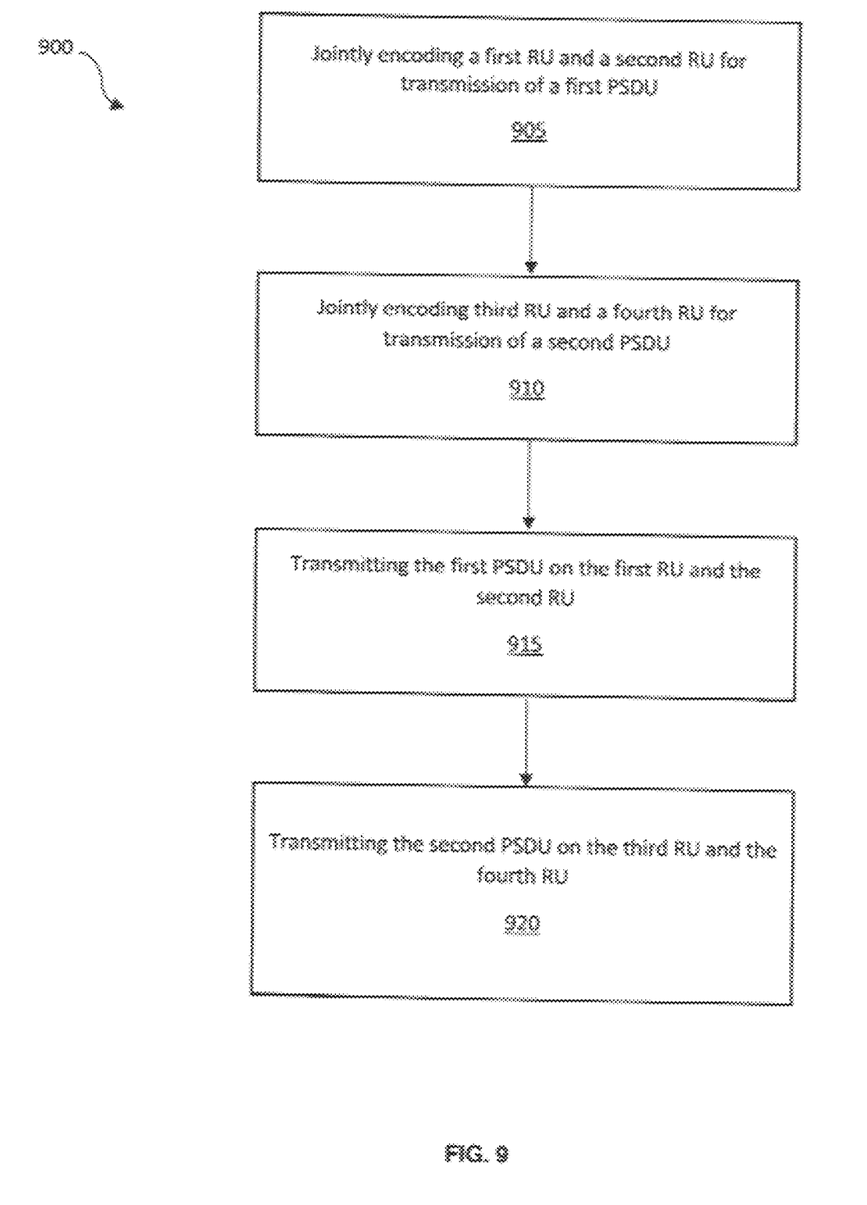
FIG. 9 is a flow chart depicting an exemplary sequence of computer implemented steps of a process for transmitting data over four RUs allocated to a single STA using mixed transmission scheme according to embodiments of the present invention.

FIG. 9 is a flow chart depicting an exemplary sequence of computer implemented steps of a process 900 for transmitting data over multiple RUs allocated to a single STA according to embodiments of the present invention. At step 905, a first RU and a second RU are jointly encoded for transmission of a first PSDU. At step 910, a third RU and a fourth RU are jointly encoded for transmission of a second PSDU. At step 915, the first PSDU is transmitted on the first RU and the second RU. At step 920, the second PSDU is transmitted on the third RU and the fourth RU.

The mixed transmission schemes described herein can indicate which PSDUs include jointly encoded RUs using an Aggregation ID field of a EHT SIG-B user field for DL mixed transmission on multiple RUs. For example, according to some embodiments, an EHT MU PPDU containing two PSDUs (PSDU #1 and PSUD #2) addressed to a single STA that are independently encoded such that the PSDU #1 is jointly encoded in $RU_i$ and $RU_j$ and PSDU #2 is jointly encoded in $RU_m$ and $RU_n$. Aggregation ID fields of an EHT SIG-B user fields of the EHT MU PPDU for $RU_i$ and $RU_j$ are set to the same value (e.g., 0), and Aggregation ID fields of an EHT SIG-B user fields for $RU_m$ and $RU_n$ are set to the same value (e.g., 1). The Aggregation ID field values of different PSDUs addressed to a single STA should not be have value.

The mixed transmission schemes described herein can indicate which PSDUs include jointly encoded RUs using an Aggregation ID field of a User Info field for UL mixed transmission on multiple RUs. The Aggregation ID field indicates that RUs on a specific PSDU are jointly encoded. According to some embodiments, an EHT TB PPDU includes two PSUDs (PSDU #1 and PSDU #2) sent from single STA and independently encoded. PSDU1 is jointly encoded in $RU_i$ and $RU_j$, and PSDU2 is jointly encoded in $RU_m$ and $RU_n$. The Aggregation ID fields of the User Info fields for $RU_i$ and $RU_j$ of the trigger frame soliciting the EHT TB PPDU are set to the same value (e.g., 0), and the Aggregation ID fields of the User Info fields for $RU_m$ and $RU_n$ of the trigger frame soliciting the EHT TB PPDU are set to the same value (e.g., 1). The Aggregation ID field includes N bits that can send up to $2^N$ PSDUs in single EHT MU PPDU. The Aggregation ID field values of different PSDUs addressed to a single STA should not have the same value.

Exemplary Computer Controlled System

Figure 10:
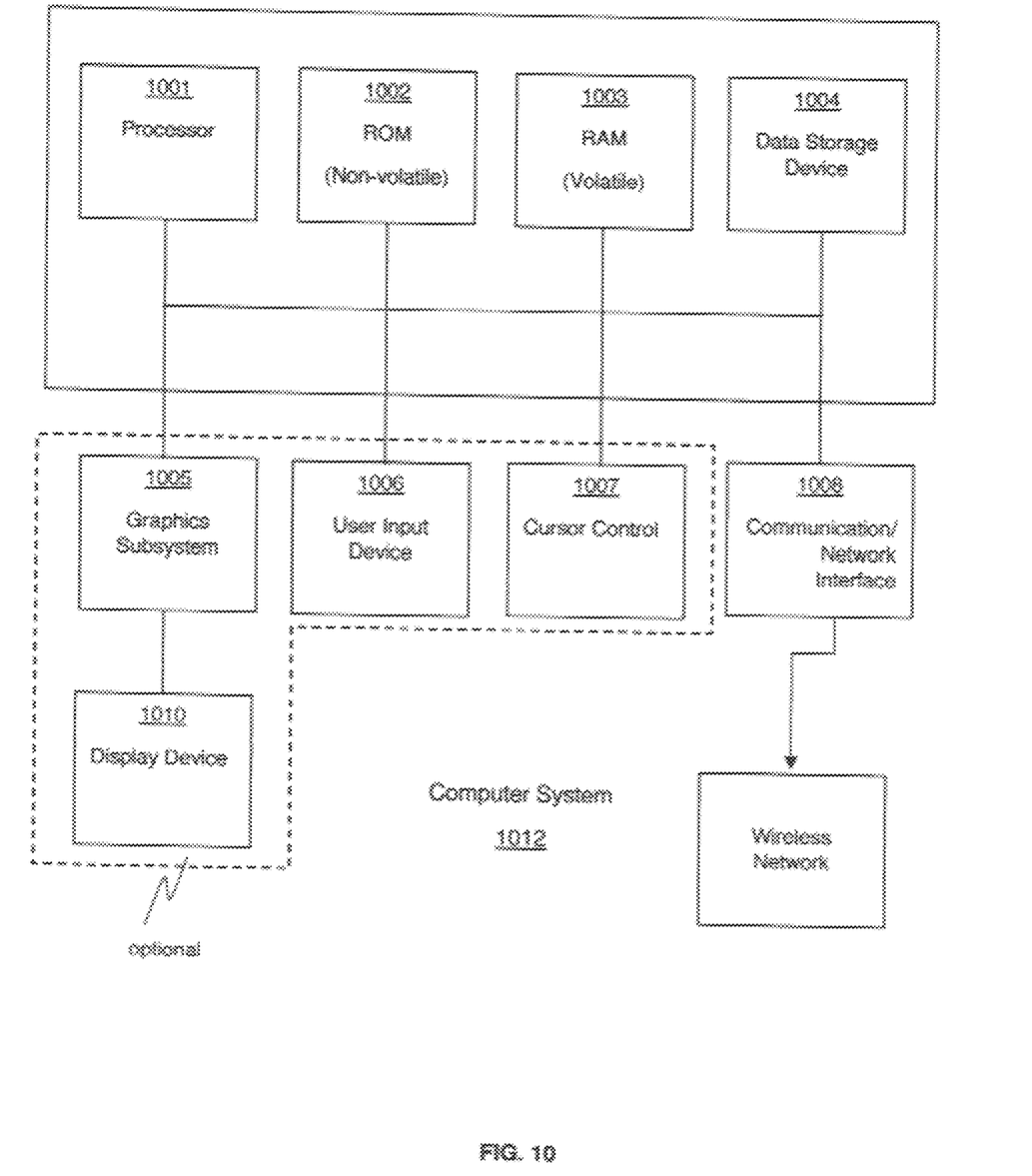
FIG. 10 is a block diagram depicting an exemplary computer system platform upon which embodiments of the present invention may be implemented.

Embodiments of the present invention are drawn to electronic systems that use multiple RUs assigned to a single wireless to send and receive data. The following discussion describes one such exemplary electronic system or computer system that can be used as a platform for implementing embodiments of the present invention. The exemplary computer system 1012 can be a wireless access point or a wireless station, for example.

In the example of FIG. 10, the exemplary computer system or wireless device includes a central processing unit (such as a processor or a CPU) 1001 for running software applications and optionally an operating system. Read-only memory 1002 and random access memory 1003 store applications and data for use by the CPU 1001. Data storage device 1004 provides non-volatile storage for applications and data and may include fixed disk drives, removable disk drives, flash memory devices, and CD-ROM, DVD-ROM or other optical storage devices. The optional user inputs 1006 and 1007 comprise devices that communicate inputs from one or more users to the computer system 1012 (e.g., mice, joysticks, cameras, touch screens, and/or microphones).

A communication or network interface 1008 includes a plurality of transceivers and allows the computer system 1012 to communicate with other computer systems, networks, or devices via an electronic communications network, including wired and/or wireless communication and including an Intranet or the Internet (e.g., 802.11 wireless standard). The network interface 1008 can use multiple resource units (RUs) allocated to the computer system 1012 in a flexible transmission scheme to utilize the available spectrum more efficiently, enhance spectral efficiency and network throughput when preamble puncturing is used, and achieve frequency diversity to improve the overall link quality. According to embodiments of the present invention, the communication or network interface 1008 can operate multiple transceivers simultaneously. The communication or network interface 1008 and can include a dual band interface that can operate in multiple bands simultaneously, such as 2.4 GHz, 5 GHz, and/or 6 GHz.

The optional display device 1010 may be any device capable of displaying visual information in response to a signal from the computer system 1012 and may include a flat panel touch sensitive display, for example, and may be remotely disposed. The components of the computer system 1012, including the CPU 1001, memory 1002/1003, data storage 1004, user input devices 1006, and graphics subsystem 1005 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data over a plurality of resource units (RUs) allocated to a single wireless station (STA) using a mixed transmission scheme based on an RU size and a number of RUs allocated to the single wireless STA, the method comprising:
   determining a number of RUs of the plurality of RUs allocated to the single wireless STA;
   determining an RU size of the plurality of RUs allocated to the single wireless STA;
   if two RUs of the number of RUs are allocated to the single wireless STA, performing a first transmission process comprising:
       jointly encoding a first RU and a second RU of the plurality of RUs for transmission of a first Physical Layer Convergence Procedure (PLCP) Service Data Unit (PSDU) to a single wireless STA;
       transmitting the first PSDU to the single wireless STA on the first RU and the second RU, wherein the first RU and the second RU are allocated to the single wireless STA;

if more than two RUs of the number of RUs are allocated to the single wireless STA, performing a second transmission process comprising:
jointly encoding a third RU and a fourth RU of the plurality of RUs for transmission of a second PSDU;
jointly encoding a fifth RU and a sixth RU of the plurality of RUs for transmission of a third PSDU;
transmitting the second PSDU to the single wireless STA on the first RU and the second RU; and
transmitting the third PSDU to the single wireless STA on the third RU and the fourth RU, wherein the third RU, the fourth RU, the fifth RU, and the sixth RU are allocated to the single wireless STA.

2. The method described in claim 1, wherein the first RU comprises a 20 MHz segment of an 80 MHz segment, and the second RU comprises a 60 MHz segment of the 80 MHz segment.

3. The method described in claim 2, further comprising puncturing at least one of: a 20 MHz segment of an 80 MHz segment; and a 40 MHz segment of the 80 MHz segment, to form the first RU and the second RU.

4. The method described in claim 3, further comprising:
performing a first modulation scheme for the first RU; and
performing a second modulation scheme for the second RU.

5. The method described in claim 1, wherein jointly encoded bits are modulated on different RUs using a first quadrature amplitude modulation (QAM) modulation scheme.

6. The method described in claim 1, wherein jointly encoded bits on the first RU are modulated with a first QAM modulation and the joint encoded bits on the second RU are modulated with a second QAM modulation.

7. The method described in claim 1, further comprising:
performing a pre-forward error correction phase; and
a post-forward error correction phase for the first RU and the second RU.

8. The method described in claim 1, wherein the PSDUs comprise an Aggregate Media Access Control Protocol Data Unit (A-MPDU).

9. The method described in claim 1, further comprising:
parsing the first RU using a first parsing phase; and
parsing the second RU using a second parsing phase.

10. A method of transmitting data over multiple resource units (RUs) allocated to a single wireless station (STA), the method comprising:
determining that a number of RUs allocated to the single wireless STA is greater than two;
responsive to the determining, jointly encoding a first RU and a second RU for transmission of a first Physical Layer Convergence Procedure (PLCP) Service Data Unit (PSDU) to a single wireless STA;
independently encoding a third RU and a fourth RU for transmission of a second PSDU;
transmitting the first PSDU to the single wireless STA on the first RU and the second RU; and
transmitting the second PSDU to the single wireless STA on the third RU and the fourth RU,
wherein the first RU, the second RU, the third RU, and the fourth RU are allocated to the single wireless STA, and
wherein the first PPDU and the second PPDU are transmitted in an HE MU PPDU comprising:
an indication that the first and second RU are jointly encoded; and
an indication that the third and the fourth RU are independently encoded.

11. The method described in claim 10, wherein the first RU and the third RU comprise 20 MHz segments, and the second RU and the fourth RU comprise 60 MHz segments.

12. The method described in claim 10, further comprising:
performing a pre-forward error correction phase; and
a post-forward error correction phase on the RUs.

13. The method described in claim 10, further comprising:
interleaving the first RU and the second RU using a first interleaving scheme; and
interleaving the third RU and the fourth RU using a second interleaving scheme.

14. The method described in claim 10, further comprising setting an Aggregation ID field to indicate that the first PSDU and the second PSDU comprise jointly encoded RUs.

15. An apparatus for transmitting data over multiple resource units (RUs) allocated to a single wireless station (STA) in a wireless network, the apparatus comprising:
a transceiver configured to send and receive data over the wireless network; and
a processor operable to:
determine a number of RUs of the plurality of Rus allocated to the single wireless STA;
determine an RU size of the plurality of Rus allocated to the single wireless STA;
if two RUs of the number of RUs are allocated to the single wireless STA, performing a first transmission process comprising:
jointly encode a first RU and a second RU for transmission of a first Physical Layer Convergence Procedure (PLCP) Service Data Unit (PSDU) to a single wireless STA;
transmit the first PSDU to the single wireless STA on the first RU and the second RU, wherein the first RU and the second RU are allocated to the single wireless STA;
if more than two RUs of the number of RUs are allocated to the single wireless STA, perform a second transmission process comprising:
jointly encode a third RU and a fourth RU for transmission of a second PSDU;
jointly encode a fifth RU and a sixth RU for transmission of a third PSDU;
transmit the second PSDU to the single wireless STA on the first RU and the second RU; and
transmit the third PSDU to the single wireless STA on the third RU and the fourth RU, wherein the third RU, the fourth RU, the fifth RU, and the sixth RU are allocated to the single wireless STA.

16. The apparatus described in claim 15, wherein the first RU comprises a 20 MHz segment of an 80 MHz segment, and the second RU comprises a 60 MHz segment of the 80 MHz segment.

17. The apparatus described in claim 16, wherein the processor is further operable to puncture at least one of: a 20 MHz segment of an 80 MHz segment; and a 40 MHz segment of the 80 MHz segment, to form the first RU and the second RU.

18. The apparatus described in claim 17, wherein the processor is further operable to:
perform a first modulation scheme for the first RU; and
perform a second modulation scheme for the second RU.

19. The apparatus described in claim 15, wherein jointly encoded bits are modulated on different RUs using a first quadrature amplitude modulation (QAM) modulation scheme.

20. The apparatus described in claim 15, wherein jointly encoded bits on the first RU are modulated with a first QAM modulation and the joint encoded bits on the second RU are modulated with a second QAM modulation.

\* \* \* \* \*